United States Patent [19]

Kato et al.

[11] Patent Number: 5,720,793

[45] Date of Patent: Feb. 24, 1998

[54] CALCIUM AGENT FOR PLANTS

[75] Inventors: Hitoshi Kato, Niimi; Yorihiki Matsubara, Okayama; Tadashi Inoue, Fukuyama, all of Japan

[73] Assignee: Bihoku Funka Kogyo Co., Ltd., Niimi, Japan

[21] Appl. No.: 674,965

[22] Filed: Jul. 3, 1996

Related U.S. Application Data

[63] Continuation of Ser. No. 395,523, Feb. 27, 1995, abandoned, which is a continuation of Ser. No. 133,637, Oct. 7, 1993, abandoned.

[30] Foreign Application Priority Data

Oct. 12, 1992 [JP] Japan ..................... 4-273179

[51] Int. Cl.$^6$ ..................... C05E 1/00
[52] U.S. Cl. ..................... 71/16; 71/903; 71/904
[58] Field of Search ..................... 71/16, 903, 904

[56] References Cited

U.S. PATENT DOCUMENTS

| | | | |
|---|---|---|---|
| 4,812,159 | 3/1989 | Freepons | 71/16 X |
| 5,208,159 | 5/1993 | Toda et al. | 435/252.1 |

FOREIGN PATENT DOCUMENTS

| | | | |
|---|---|---|---|
| A-0 427 094 | 5/1991 | European Pat. Off. | |
| 3228888 | 10/1991 | Japan | 71/9 |

OTHER PUBLICATIONS

Derwent Publications, Ltd., London, GB; AN 91-298699, Abstract of JP-A-3 197 379 Aug. 1991.
Patent Abstracts of Japan, vol. 017, No. 382 (C-1085) 19 Jul. 1993, Abstract of JP-A-05 065 368.
Derwent Publications Ltd., London, GB; An 93-299500, Abstract of JP-A-5 213 686 Aug. 1993.
Derwent Publications Ltd., London, GB; AN 93-039326, Abstract of JP-A-4-363 200 Dec. 1992.
CA119(23) 249057A, Aonuma, "Prep of Indoor . . . Vinegar" Aug. 24, 1993.

*Primary Examiner*—Ferris Lander
*Attorney, Agent, or Firm*—Oblon, Spivak, McClelland, Maier & Neustadt, P.C.

[57] ABSTRACT

An object of this invention is to obtain a calcium agent for plants, which enters into cells of a plant so as to derive the physiological activity basically for DNA and RNA activation and to enhance the absorbability of calcium into the living plant. Therefore, the calcium agent for plants, contains, as main components, water-soluble low molecular weight chitosan having an average molecular weight of 500 to 30000 consisting of chitosan and/or chito-oligosaccharide and/or derivatives thereof, an inorganic substance including calcium element and/or a water-soluble organic substance including calcium element, and if necessary, water-soluble organic acid. By administering this calcium agent, lime deficiency diseases of plants can be prevented.

2 Claims, No Drawings

CALCIUM AGENT FOR PLANTS

This application is a Continuation of application Ser. No. 08/395,523, filed on Feb. 27, 1995, now abandoned, which is a Continuation of application Ser. No. 08/133,637, filed Oct. 7, 1993, abandoned.

BACKGROUND OF THE INVENTION

1. Industrial Field of the Invention

The present invention relates to a calcium agent for plants, which enters into cells of a plant so as to derive the physiological activity basically for DNA and RNA activation and to enhance the absorbability of calcium into the living plant.

2. Prior Art

In culture of vegetables and fruit trees, calcareous fertilizers are used for the purpose of soil improvement in a wide range, including neutralization of acid soil, supplying lime, increasing the fertility maintenance capacity of soil, increasing microbial activity, promoting decomposition of organic substances, formation of soil nodules, and so forth.

As a calcareous fertilizer, there are quick lime, slaked lime, a calcium carbonate fertilizer, a shell fossil fertilizer, a by-product lime fertilizer, and a mixed lime fertilizer, which are specified in the official standard. Further, as a fertilizer allowed to contain a calcareous fertilizer or gypsum, there are lime nitrogen, a phosphatic fertilizer from prepared slug, a processed bittern potassic fertilizer, a potassium silicate fertilizer, superphosphate of lime, double superphosphate of lime, a complex fertilizer, a mixed fertilizer, and so forth.

In relation to a manufacturing method of a calcareous fertilizer which is granulated with saccharides serving as a binder, the following documents can be found. Granulating methods of calcareous substances in which condensed liquid of stephene liquid waste which is a by-product of beet sugar is used as a granulating agent are disclosed in Japanese Patent Examined Publication Nos. 59-38181, 59-9513 and 59-30675, and a manufacturing method of a calcareous fertilizer in which calcium carbonate, and liquid waste and residues of whiskey distillation are mixed and granulated is disclosed in Japanese Patent Unexamined Publication No. 57-196783. Also, a calcareous fertilizer to cause calcium in the form of calcium formate to be actively absorbed into a living plant from the leaf surfaces is disclosed in Japanese Patent Examined Publication No. 62-28117.

SUMMARY OF THE INVENTION

It is a known fact that large-amount elements for growing plants such as vegetables, fruit trees and trees are four elements of nitrogen, phosphorus, potassium and calcium. In vegetables and fruit trees, physiological defects induced by deficiency of calcium among these elements have been found to appear as so-called lime deficiency diseases, e.g., the blossom-end rot of fruits such as tomatoes, green peppers, eggplants, apples and pears, wilt leaves of cucumbers, dead hearts of Chinese cabbages and cabbages, decay hearts of celery, shungiku (*Chrysanthemum coronarium*) and so on, dwarf hearts of spinach, komatsuna (*Brassica Rapa var. pervidis*) and so on.

Such deficiency diseases are not observed only when the soil is deficient in lime. Even if sufficient available lime exists in the soil, absorption of lime is suppressed when the soil is dried, or when water absorption is hindered owing to high concentration of salts in the soil, or when ammonia nitrogen or a potassic fertilizer exists excessively. Consequently, those portions of a plant which are vigorously growing at the moment, i.e., tissue sections where cell division is prosperous, will abruptly exhibit a lime deficiency disease in some cases.

At present, there are no measures for perfectly preventing such lime deficiency diseases. Depending upon the situation of each case, there is merely employed (1) a method of continuous administration of lime on the basis of diagnosis of the soil, (2) a method of sprinkling a calcium chloride solution over the leaf surfaces every three or four days as an emergency measure, or (3) a method of appropriate watering to prevent the soil from being dried. The calcareous fertilizers and the like which are disclosed in the above-mentioned patent publications do not thoroughly cure the lime deficiency diseases.

Concerning trees, there are observed examples in which damages by some kinds of germs and insects are increased in air polluted areas as compared with non-polluted areas. For example, needle blight by sooty mold of pines is often caused in an area with a high $SO_2$ concentration and damages red pines constantly. This disease is not caused simply by contact with the germs. In combination with $SO_2$ contact, pine trees catch the disease. Moreover, diseases of pines such as needle cast, and vermin damages due to tree parasitism of scale insects, aphids and so forth, are conspicuously observed in air polluted areas, and their relationship with air pollution can not be denied. Also, air pollution can be regarded as a remote cause of pine wilt disease by pine wood nematodes which has prevailed all over Japan. Kinds of trees which have particularly low resistances against air pollution, e.g., red pines, cypresses and cedars, are characterized in that an amount of calcium in the tree is statistically larger than amounts of other nutrimental substances such as phosphorus, potassium and magnesium. Therefore, these kinds of trees can be thought to require an accordingly large amount of calcium.

Thus, measures for thoroughly preventing lime deficiency diseases which may be induced in almost all kinds of cultured vegetables and fruit trees, and means for preventing decay of trees owing to air pollution which is a global problem, have been problems to be quickly solved.

Taking these matters into account, the inventors of the present application have developed a calcium agent for plants, containing, as main components, water-soluble low molecular weight chitosan having an average molecular weight of 500 to 30000 consisting of chitosan and/or chito-oligosaccharide and/or derivatives thereof, an inorganic substance including calcium element and/or a water-soluble organic substance including calcium element. In the case where the inorganic substance including calcium element is not easily dissolved in water (e.g., calcium carbonate), water-soluble organic acid is added, if necessary.

Chitosan is used for metal absorbents, enzyme fixation carriers, drug delivery system carriers, medical materials, seed pre-treatment agents, cosmetics and so forth, and products such as artificial skin, suture thread, shampoo, rinse, chitosan beads and chitosan fiber are available on the market. Further, chitosan is suitable for organic non-chemical culture of vegetables because chitosan binds with residual chemicals together with effective components and inactivates the residual chemicals. Administration of chitosan produces the antimicrobial, antiviral effect with respect to fusarium, rhizoctonia and the like, and exhibits disease resistance for vegetables and fruit trees. When chitosan is supplied into the soil, actinomyces in the soil multiply, and the resultant antagonism functions to suppress the occurrence of soil blight. Further, it prevents the stem rot of cucumbers, and it is also effective for preventing tomatoes from being attached by diseases. As for riceplants, the effect of chitosan is observed in relation to the crop, disease resistance, cold resistance, heat resistance, reduction of the fertilizer, prevention of lodging, work reduction and so forth, and chitosan is supposed to promote growth of the roots.

Of all kinds of chitosan, water-soluble low molecular weight chitosan having an average molecular weight of 500 to 30000 and/or derivatives thereof which can be observed to have been permeated into cells of a plant can derive the enzyme activity when they enter into the cells. This kind of chitosan and/or derivatives thereof have been found to increase an amount of ionized calcium ($Ca^{2+}$) absorbed into a living plant when they are administered in the form of a solution with an inorganic substance including calcium element and/or a water-soluble organic substance including calcium element and water-soluble organic acid.

The calcium agent for plants according to the present invention is I) a granular molding obtained by adding 0.01 to 50 parts of dry powder of water-soluble low molecular weight chitosan and/or derivatives thereof, 0.5 to 10 parts of an excipient and a disintegrator, and, if necessary, 1 to 100 parts of water-soluble crystal organic acid powder, to 100 parts of powder of an inorganic substance including calcium element and/or a water-soluble organic substance including calcium element, and molding this mixture by a dry method, or a tablet-like molding obtained by further adding 0.1 to 5 parts of a lubricant to it and molding the mixture by a dry granule compressing method or a direct powder compressing method.

Alternatively, the calcium agent for plants according to the invention is II) a granular molding obtained by adding, if necessary, 1 to 100 parts of water-soluble crystal organic acid powder to 100 parts of powder of an inorganic substance including calcium element and/or a water-soluble organic substance including calcium element, adding thereto a liquid mixture of 0.01 to 50 parts of a solution (at content) of water-soluble low molecular weight chitosan and/or derivatives thereof and 0.5 to 10 parts of a binder solution (at content), and molding the mixture by a so-called wet method, or a tablet-like molding obtained by further adding 0.1 to 5 parts of a lubricant to it and molding the mixture by a so-called wet granule compressing method.

Further, the calcium agent for plants according to the invention is III) a solution or a water suspension consisting of 0.1 to 80 weight % powder of an inorganic substance including calcium element and/or a water-soluble organic substance including calcium element, 0.0001 to 20 weight % water-soluble low molecular weight chitosan and/or derivatives thereof, and, if necessary, 0.1 to 50 weight % water-soluble organic acid. This calcium agent is not limited to any of such forms as powder, grains and so forth.

The water-soluble low molecular weight chitosan and/or derivatives thereof in this invention are derivatives whose basic unit is D-glucosamine, and there can be employed any of (1,4)-2-amino-2-deoxy-β-D-glucan (chitosan), N-carboxymethyl chitosan, glycol chitosan, chitosan phosphate, N-salicylidene chitosan, 4-nitrobenzylidene chitosan, N-(O-carboxybenzyl)chitosan, dicarbamate chitosan, chitosan-2,5-anhydromannose, chitosan-heparin, chitosan-dextran sulfuric acid, chitosan-carboxymethyldextran, N-acylated chitosan-acid glucosaminoglycan, chitosan-carboxymethylcellulose, chitosan-polyphosphoric acid, glycolchitosan-dextran sulfuric acid, glycolchitosan-carboxymethylcellulose, glycolchitosan-polygalacturonic acid, glycolchitosan-alginic acid, and chitosan-methylglycolchitosan-polyvinylalcohol sulfuric acid, which has an average molecular weight of 500 to 30000 and which can be dissolved in water and/or dilute acid.

As the inorganic substance including calcium element and the water-soluble organic substance including calcium element in this invention, there can be employed one or more than one of natural and synthetic substances of calcium carbonate, calcium hydroxide, calcium oxide, calcium peroxide, basic calcium carbonate, calcium permanganate, calcium chromate, calcium silicide, calcium silicate, calcium metasilicate, wollastonite, calcium hypochlorite, calcium bromide, calcium oxalate, dolomite, calcium sulfide, calcium sulfate, calcium sulfite, calcium thiosulfate, calcium sulfoaluminate, calcium nitrate, calcium hydrosulfide, calcium chloride, calcium chlorate, calcium I-phosphate, calcium II-phosphate, calcium III-phosphate, calcium pyrophosphate, calcium dihydrogenpyrophosphate, calcium nitride, calcium fluoride, calcium iodide, calcium ethylenediaminetetraacetate, carboxymethylcellulose calcium, calcium glycerophosphate, gluconic calcium, calcium formate, calcium citrate, calcium succinate, calcium acetate, D-tartaric calcium, calcium stearyllactate, calcium lactate, pantothenic calcium, calcium propionate, gluconogalacto-gluconic calcium, L-aspartic calcium, L-malic calcium and so on.

As the water-soluble organic acid, there can be employed one or more than one of adipic acid, L-aspartic acid, DL-aspartic acid, acetylsalicylic acid, allylmalonic acid, alloxan acid, isatin acid, isosaccharic acid, isopropylidenesuccinic acid, itaconic acid, oxalacetic acid, 3-oxyphthalic acid, D-galactonic acid, quinic acid, citric acid, glycolic acid, glutaconic acid, L-glutamic acid, glutaric acid, crotonic acid, succinic acid, diethoxalic acid, 4,5-dioxyphthalic acid, diglycolic acid, 1,1-cyclopropanedicarboxylic acid, DL-citramalic acid, α, α-dimethylsuccinic acid, dimethylmalonic acid, oxalic acid, D-tartaric acid, 3,4,5,6-tetrahydrophthalic acid, tricarballylic acid, tribromoacetic acid, naphtholsulfonic acid, lactic acid, violuric acid, hydantoic acid, pinacone acid, pimelic acid, 2-pyrrolecarboxylic acid, β-phenyllactic acid, β-phenylhydroacrylic acid, phenol-2,4-disulfonic acid, phthalic acid, racemic acid, fumaric acid, bromoacetic acid, maleic acid, maleic anhydride, malonic acid, phthalic anhydride, L-malic acid, DL-malic acid, formic acid, acetic acid, propionic acid, butyric acid, valeric acid and so on. Of these examples, acetic acid, lactic acid, L-aspartic acid, DL-aspartic acid and citric acid are preferable.

As the excipient, lactose, sugar, glucose, starch, crystal cellulose, polyvinylpyrrolidone or the like can be used. As the binder, starch paste solution, hydroxypropylcellulose solution, carboxymethylcellulose solution, gum arabic solution, gelatin solution, glucose solution, sugar solution, traganth solution, sodium alginate solution, polyvinylpyrolidone solution or the like can be used. Carboxymethylcellulose calcium can be used as the disintegrator.

The lubricant can be selected from magnesium stearate, refined talc, stearic acid, calcium stearate and so forth.

Even if sufficient available lime exists in the soil, absorption of lime is suppressed when the soil is dried, or when water absorption is hindered owing to high concentration of salts, or when ammonia nitrogen or a potassic fertilizer exists excessively. Thus, lime deficiency diseases in vegetables and fruit trees tend to occur in those tissue sections where cell division is prosperous, such as new leaves and fruits.

Such a phenomenon is caused mainly because different kinds of nutrimental elements move differently after they are absorbed into a plant. Nitrogen, phosphoric acid, potassium, magnesium and so forth have such properties as to move freely to new leaves and fruits when absorption from the roots is decreased after entering into a plant. Even if the plant is deficient in these elements during its growth, the elements contained in old leaves, which have been absorbed at an early stage of the growth, move to young leaves. On the other hand, calcium, boron and so forth have such properties as not to move to new leaves and fruits once they enter into a plant and are distributed to each leaf even if absorption from the roots is decreased so that growing portions of the plant require these elements. Consequently, in the case where both the kinds of elements exist in the soil sufficiently, a large amount of the former elements, e.g., nitrogen and potassium, which are highly movable in the plant, is absorbed from the roots, whereas absorption of the latter elements such as calcium which do not move in the plant well is hindered.

The water-soluble low molecular weight chitosan and/or derivatives thereof in this invention which have an average molecular weight of 500 to 30000 and are observed to have been permeated into cells are found to exist toward the nucleus. These derivatives can be thought to permeate through nuclear membranes to control the DNA gene expression, and they induce promotion of multiplication and differentiation of the cells. Moreover, the derivatives induce calmodulin, which is $Ca^{2+}$ receptor protein widely distributed in eukaryotic cells, to be combined with $Ca^{2+}$, and the combined calmodulin activates inert enzymes, such as α-amylase and ATPase, in the existence of $Ca^{2+}$.

In other words, the water-soluble low molecular weight chitosan and/or derivatives thereof, which are the constituents of the calcium agent for plants according to the present invention, produce Ca ion currents owing to induction of the activity of calmodulin in a living plant, especially in those portions where cells multiply and differentiate. As a result, although $Ca^{2+}$ is originally inferior in the movability, movement of $Ca^{2+}$ to new leaves and fruits can be promoted. Also, $Ca^{2+}$ ions are separated from the main components such as the inorganic substance including calcium element and the water-soluble organic acid and/or the water-soluble organic substance including calcium element, and it is possible to increase an amount of the $Ca^{2+}$ absorbed from the roots. Thus, the problems of lime deficiency diseases of vegetables and fruit trees can be thoroughly solved.

In the case of trees, it goes without saying that debility of trees whose remote cause is air pollution brings blight by various kinds of disease and pest. Air pollutant $SO_2$ is absorbed, as a gas component from the stomata and as an acid rain component from the roots, into a tree by a quantity more than necessary. The physiological activity of cells of a plant is controlled by the pH inside and outside of the membrane, and $Ca^{2+}$ is particularly important as a substance used for the control.

Consequently, if acid components such as $SO_2$ and aluminum ions which have become soluble in acid soil are excessively absorbed into trees, broad-leaved trees and the like can partially discharge these acid components out of the trees through leaf coloring and defoliation. However, evergreen coniferous trees and the like are supposed to accumulate the acid components in the trees in the un-injured form such as calcium salt.

As described before, calmodulin combined with $Ca^{2+}$ induces various kinds of physiological activities. That is to say, when acid components which are air pollutants are excessively absorbed into a tree, as described above, $Ca^{2+}$ must be used for neutralization. Therefore, even if the total amount of $Ca^{2+}$ in the tree is sufficient, the amount of $Ca^{2+}$ which is required for actual living is inadequate.

Pines, cedars, cypresses, firs and so forth which particularly require $Ca^{2+}$ have low resistance against air pollution because the soil can not supply $Ca^{2+}$ by the quantity required for neutralization of acid components and physiological activity in the trees.

In other words, decay of trees owing to air pollution can be regarded as a lime deficiency disease of trees caused by air pollutants.

Therefore, the calcium agent for plants according to the present invention functions in trees in substantially the same manner as described above, so that absorption of $Ca^{2+}$ into the trees will be promoted, and that calmodulin will be induced to be combined with $Ca^{2+}$, to thereby enhance the physiological activity. Thus, the resistance against disease and pest can be improved by a remarkable degree.

DETAILED DESCRIPTION OF THE INVENTION

The present invention will now be described more specifically on the basis of embodiments. However, this invention will not be restricted to these embodiments.

EXAMPLE 1

A liquid mixture of 150 g of 10 weight % solution of (1,4)-2-amino-2-deoxy-β-D-glucan (chitosan) having an average molecular weight of 20000 and 100 g of 20 weight % solution of starch was added to 965 g of calcium I-phosphate [calcium dihydrogenphosphate] powder (Ca content: 16%), and sufficiently kneaded into a paste-like mixture by a kneader. This mixture was supplied to and molded by an extrusion molding machine of rotary blade type, HATA-HC-120 (manufactured by Hata Iron Works., Ltd.), and dried in an oven dryer of constant temperature type which was set at a temperature of 60° C. After the molding was pulverized, grading was performed by a sieve. Thus, 1 kg of a calcium agent for plants which was a granular molding of 0.5 to 1 mm was obtained.

EXAMPLE 2

4.74 kg of calcium lactate powder (Ca content: 13%) was filled in a fluidized-bed granulating machine, FLO-5 (manufactured by Freund Ind., Co. Ltd.), and a fluidized bed was formed by blowing a hot blast at a temperature of 80° C. into the machine at a flow rate of 3 to 4 $Nm^3$/min. A liquid mixture of 600 g of 10 weight % solution of (1,4)-2-amino-2-deoxy-β-D-glucan (chitosan) having an average molecular weight of 12000, 500 g of 20 weight % solution of gum arabic, and 250 g of 40 weight % solution of calcium permanganate (Ca content: 11%) was added to this fluidized bed at a flow rate of 100 ml/min, so as to granulate and grow the powder gradually. Thus, about 5 kg of a calcium agent for plants which was a granular molding of 0.3 to 1 mm was obtained.

EXAMPLE 3

30 g of (1,4)-2-amino-2-deoxy-β-D-glucan (chitosan) dry powder having an average molecular weight of 3000, 200 g of lactic acid powder and 20 g of lactose powder were added to 750 g of calcite calcium carbonate (Ca content: 39.5%) having an average particle size of 5 μm, and sufficiently mixed by a ribbon blender. By supplying this powder mixture to a roller compactor, TF-156 (manufactured by Freund Ind., Co. Ltd.), which is a dry granulating machine, 1 kg of a calcium agent for plants which was a granular molding of 0.3 to 1 mm was obtained.

EXAMPLE 4

3 kg of wollastonite (Ca content: 34%) having an average particle size (length) of 20 μm and 2 kg of L-aspartic acid powder were sufficiently mixed by a ribbon blender. This powder mixture was filled in a fluidized-bed granulating machine, FLO-5 (manufactured by Freund Ind., Co. Ltd.), and a fluidized bed was formed by blowing a hot blast at a temperature of 80° C. into the machine at a flow rate of 3 to 4 $Nm^3$/min. A liquid mixture of 2 kg of 5 weight % solution of N-carboxymethyl chitosan having an average molecular weight of 10000 and 1.3 kg of 7.5 weight % solution of HPC-L (hydroxypropylcellulose) was added to this fluidized bed at a flow rate of 100 ml/min, so as to granulate and grow the powder gradually. Thus, about 5 kg of a calcium agent for plants which was a granular molding of 0.3 to mm was obtained.

EXAMPLE 5

3.95 kg of calcium glycerophosphate powder (Ca content: 19%) and 775 g of oxalacetic acid powder were sufficiently mixed by a ribbon blender. This powder mixture was filled in a fluidized-bed granulating machine, FLO-5 (manufactured by Freund Ind., Co. Ltd.), and a fluidized bed was formed by blowing a hot blast at a temperature of 80° C. into the machine at a flow rate of 3 to 4 $Nm^3$/min. A liquid mixture of 1.5 kg of 5 weight % solution of chitosan-2,5-anhydromannose having an average molecular weight of 18000, 500 g of 20 weight % solution of gum arabic, and 250 g of 40 weight % solution of calcium permanganate (Ca content: 11%) was added to this fluidized bed at a flow rate of 100 ml/min, so as to granulate and grow the powder gradually. Thus, about 5 kg of a calcium agent for plants which was a granular molding of 0.3 to 1 mm was obtained.

EXAMPLE 6

20 g of chitosan-carboxymethylcellulose dry powder having an average molecular weight of 20000, 20 g of lactose, and 10 g of magnesium stearate were added to 950 g of calcium citrate powder (Ca content: 21%), and sufficiently mixed by a ribbon blender. This powder mixture was supplied to a rotary tablet machine, HT-P18A (manufactured by Hata Iron Works., Ltd.), and molded at a tablet making pressure of 800 kg by a so-called direct powder compressing method. Thus, 1 kg of a calcium agent for plants which was a tablet-like molding having a diameter of 8 mmφ and a weight of 0.2 g/tablet was obtained.

EXAMPLE 7

A liquid mixture of 200 g of 5 weight % solution of chitosan-2,5-anhydromannose having an average molecular weight of 5000 and 100 g of 20 weight % solution of gum arabic was added to 480 g of dolomite (Ca content: 21%) having an average particle size of 10 μm, and sufficiently kneaded into a paste-like mixture by a kneader. This mixture was supplied to and molded by an extrusion molding machine of rotary blade type, HATA-HC-120 (manufactured by Hata Iron Works., Ltd.), and dried in an oven dryer of constant temperature type which was set at a temperature of 60° C. After the molding was pulverized, grading was performed by a sieve. Thus, a granular molding of 0.5 to 1 mm was obtained. 460 g of citric acid powder and 30 g of refined talc were added to this molding, and mixed by a ribbon blender. This mixture was supplied to a rotary tablet machine, HT-P18A (manufactured by Hata Iron Works., Ltd.), and molded at a tablet making pressure of 800 kg by a so-called wet granule compressing method. Thus, 1 kg of a calcium agent for plants which was a tablet-like molding having a diameter of 8 mmφ and a weight of 0.2 g/tablet was obtained.

EXAMPLE 8

450 g of calcium acetate (Ca content: 22%), 10 g of dry powder of glucol chitosan having an average molecular weight of 3000, and 30 g of acetic acid were dissolved in 510 g of water at a room temperature, thereby obtaining 1 kg of a calcium agent for plants in the form of solution.

EXAMPLE 9

220 g of calcium acetate (Ca content: 22%), 50 g of chitosan dry powder of Example 1, and 30 g of acetic acid were dissolved in 700 g of water at a room temperature, thereby obtaining 1 kg of a calcium agent for plants in the form of solution.

COMPARATIVE EXAMPLE 1

450 g of calcium acetate (Ca content: 22%), 10 g of dry powder of high molecular weight chitosan (manufactured by Nippon Reinetu, Co., Ltd.) having an average molecular weight of 50000 and 30 g of acetic acid were dissolved in 510 g of water at a room temperature, thereby obtaining 1 kg of a solution.

COMPARATIVE EXAMPLE 2

30 g of D-glucosamine (chito-oligosaccharide) dry powder having an average molecular weight of 360, 200 g of lactic acid powder and 20 g of lactose powder were added to 750 g of calcite calcium carbonate (Ca content: 39.5%) having an average particle size of 5 μm, and sufficiently mixed by a ribbon blender. By supplying this powder mixture to a roller compactor, TF-156 (manufactured by Freund Ind., Co. Ltd.), which is a dry granulating machine, 1 kg of a granular molding of 0.3 to 1 mm was obtained.

COMPARATIVE EXAMPLE 3

220 g of lactic acid powder, and 30 g of magnesium stearate were added to 750 g of calcite calcium carbonate (Ca content: 39.5%) having an average particle size of 5 μm, and sufficiently mixed by a ribbon blender. This powder mixture was supplied to a rotary tablet machine, HT-P18A (manufactured by Hata Iron Works., Ltd.), and molded at a tablet making pressure of 800 kg by a so-called direct powder compressing method. Thus, 1 kg of a tablet-like molding having a diameter of 8 mm φ and a weight of 0.2 g/tablet was obtained.

COMPARATIVE EXAMPLE 4

Calcite calcium carbonate (Ca content: 39.5%) having an average particle size of 5 μm.

COMPARATIVE EXAMPLE 5

Calcium nitrate powder (Ca content: 24%).

COMPARATIVE EXAMPLE 6

Calcium acetate powder (Ca content: 22%).

Compositions of the products according to the above-described embodiments are shown in Table 1, and compositions of the products according to the comparative examples are shown in Table 2.

ditions while applying the calcium agents for plants of Examples 1 to 9 by quantities shown in Table 3, and the Ca content in each case was measured.

The results are likewise shown in Table 3.

TABLE 1

[WEIGHT %]

| | KIND OF CHITOSAN | INORGANIC SUBSTANCE CONTAINING Ca | ORGANIC SUBSTANCE CONTAINING Ca | ORGANIC ACID | BINDER LUBRICANT | FORM | Ca CONTENT |
|---|---|---|---|---|---|---|---|
| EXAMPLE 1 | CHITOSAN 1.5 | CALCIUM I-PHOSPHATE 96.5 | — | — | 2 | GRANULES | 15 |
| 2 | CHITOSAN 1.2 | Ca PERMANGANATE 2 | Ca LACTATE 94.8 | — | 2 0 | GRANULES | 12 |
| 3 | CHITOSAN 3 | Ca CARBONATE 75 | — | LACTIC ACID 20 | 2 0 | GRANULES | 30 |
| 4 | N-CM CHITOSAN 2 | Ca SILICATE 58 | — | ASPARTIC ACID 38 | 2 0 | GRANULES | 20 |
| 5 | CHITOSAN-AHM 1.5 | Ca PERMANGANATE 2 | Ca GLYCERO-PHOSPHATE 79 | OXALACETIC ACID 15.5 | 2 0 | GRANULES | 15 |
| 6 | CHITOSAN-CMS 2 | — | Ca CITRATE 95 | — | 2 1 | TABLETS | 20 |
| 7 | CHITOSAN-AHM 1 | DOLOMITE 48 | — | CITRCI ACID 46 | 2 3 | TABLETS | 10 |
| 8 | GLUCOL CHITOSAN 1 | — | Ca ACETATE 45 | ACETIC ACID 3 | WATER 51 | SOLUTION | 10 |
| 9 | CHITOSAN 5 | — | Ca ACETATE 22 | ACETIC ACID 3 | WATER 70 | SOLTUION | 5 |

TABLE 2

[WEIGHT %]

| | KIND OF CHITOSAN | INORGANIC SUBSTANCE CONTAINING Ca | ORGANIC SUBSTANCE CONTAINING Ca | ORGANIC ACID | BINDER LUBRICANT | FORM | Ca CONTENT |
|---|---|---|---|---|---|---|---|
| COMPARATIVE EXAMPLE 1 | HIGH MOLECULAR WEIGHT CHITOSAN 1 | — | Ca ACETATE 45 | ACETIC ACID 3 | WATER 51 | SOLUTION | 10 |
| 2 | OLIGO-SACCHARDIE 3 | Ca CARBONATE 75 | — | LACTIC ACID 20 | 2 0 | GRANULES | 30 |
| 3 | — | Ca CARBONATE 75 | — | LACTIC ACID 22 | 0 3 | TABLETS | 30 |
| 4 | — | Ca CARBONATE 100 | — | — | — | POWDER | 40 |
| 5 | — | Ca NITRATE 100 | — | — | — | POWDER | 24 |
| 6 | — | Ca ACETATE 100 | — | — | — | POWDER | 22 |

APPLICATION EXAMPLE 1

Cultivation tests of komatsuna (*Brassica Rapa var. pervidis*) were performed under the following culture con-

TABLE 3

|  | TEST AREA | AMOUNT OF ADMINISTRATION | | TOTAL AMOUNT OF | KOMATSUNA AFTER 60 DAYS' GROWTH | |
|---|---|---|---|---|---|---|
|  |  | AMOUNT OF Ca g/m² | AMOUNT OF CHITOSAN mg/m² | Ca IN CULTURE MEDIUM g/m² | DRY WEIGHT g/10 PLANTS | Ca CONTENT mg/100 g |
| EXAMPLE | 1  4 | 600 | 60 | 11.6 | 165 | 623 |
|  | 2  5 | 600 | 60 | 11.6 | 175 | 672 |
|  | 3  2 | 600 | 60 | 11.6 | 170 | 668 |
|  | 4  3 | 600 | 60 | 11.6 | 150 | 648 |
|  | 5  4 | 600 | 60 | 11.6 | 185 | 678 |
|  | 6  3 | 600 | 60 | 11.6 | 160 | 652 |
|  | 7  6 | 600 | 60 | 11.6 | 180 | 675 |
|  | 8  6 | 600 | 60 | 11.6 | 150 | 643 |
|  | 9  12 | 600 | 600 | 11.6 | 200 | 685 |
| COMPARATIVE EXAMPLE | 1  6 | 600 | 60 | 11.6 | 130 | 589 |
|  | 2  2 | 600 | 60 | 11.6 | 130 | 580 |
|  | 3  2 | 600 | — | 11.6 | 120 | 581 |
|  | 4  1.5 | 600 | — | 11.6 | 120 | 576 |
|  | 5  2.5 | 600 | — | 11.6 | 120 | 588 |
|  | 6  2.7 | 600 | — | 11.6 | 100 | 590 |
| CONTROL | — | — | — | 11.0 | 110 | 584 |

Analysis of the Ca content was performed by a potassium-permanganate volumetric method.

[Culture Conditions]

| Basic culture medium: | Surface humus andosoil (planter culture) | 1 m² |
|---|---|---|
| Fertilizer administration: | N/P/K = 4/6/2 | 250 g/m² |
|  | Magnesia lime (Ca content: 22%) | 50 g/m² |
| Cultivation temperature: | 25° C. | |
| Cultivation time: | 60 days | |
| Light irradiation: | Artificial climate creator 7000 luces × 16 hours × 57 days after screened from light for three days | |
| Watering: | Once/day | |
| Seed: | Komatsuna 20 grains/test area (planter) were sowed without pre-treatment | |
| Thining: | When 10 days elapse after sowing, 10 favorably growing plants for each example were selected. | |

-continued

[Culture Conditions]

| Administration method: | Administration timing ... Only once immediately after thinning Administration method ... A predetermined amount of each calcium agent was dissolved or suspended in 200 ml of water and sprinkled over the entire surface of the planter. |
|---|---|

COMPARATIVE APPLICATION EXAMPLE 1

Tests similar to those of the application example 1 were performed with products of the comparative examples 1 to 6.

The results are likewise shown in Table 3.

APPLICATION EXAMPLE 2

Cultivation tests of lettuce were performed under the following culture conditions which easily induce lime deficiency diseases while administering the calcium agents for plants of Examples 1 to 9 by quantities shown in Table 4, and the Ca content and a rate of occurrence of tipburns in each case was measured. The results are likewise shown in Table 4.

TABLE 4

|  | TEST AREA | AMOUNT OF ADMINISTRATION | | TOTAL AMOUNT OF | LETTUCE AFTER 60 DAYS' GROWTH | | RATE OF |
|---|---|---|---|---|---|---|---|
|  |  | AMOUNT OF Ca g/m² | AMOUNT OF CHITOSAN mg/m² | Ca IN CULTURE MEDIUM g/m² | DRY WEIGHT g/10 PLANTS | Ca CONTENT mg/100 g | OCCURRENCE OF TIPBURNS % |
| EXAMPLE | 1  4 | 600 | 60 | 11.6 | 625 | 963 | 10 |
|  | 2  5 | 600 | 60 | 11.6 | 685 | 982 | 0 |
|  | 3  2 | 600 | 60 | 11.6 | 680 | 983 | 0 |
|  | 4  3 | 600 | 60 | 11.6 | 690 | 972 | 10 |
|  | 5  4 | 600 | 60 | 11.6 | 715 | 995 | 0 |
|  | 6  3 | 600 | 60 | 11.6 | 680 | 965 | 10 |
|  | 7  6 | 600 | 60 | 11.6 | 720 | 988 | 0 |
|  | 8  6 | 600 | 60 | 11.6 | 700 | 976 | 0 |
|  | 9  12 | 600 | 600 | 11.6 | 720 | 1085 | 0 |

TABLE 4-continued

| | AMOUNT OF ADMINISTRATION | | TOTAL AMOUNT OF | LETTUCE AFTER 60 DAYS' GROWTH | | |
|---|---|---|---|---|---|---|
| TEST AREA | AMOUNT OF Ca mg/m$^2$ | AMOUNT OF CHITOSAN mg/m$^2$ | Ca IN CULTURE MEDIUM g/m$^2$ | DRY WEIGHT g/10 PLANTS | Ca CONTENT mg/100 g | RATE OF OCCURRENCE OF TIPBURNS % |
| COMPARATIVE EXAMPLE 1 | 6 600 | 60 | 11.6 | 560 | 923 | 30 |
| 2 | 2 600 | 60 | 11.6 | 540 | 921 | 40 |
| 3 | 2 600 | — | 11.6 | 520 | 916 | 50 |
| 4 | 1.5 600 | — | 11.6 | 480 | 906 | 50 |
| 5 | 2.5 600 | — | 11.6 | 520 | 914 | 50 |
| 6 | 2.7 600 | — | 11.6 | 550 | 926 | 40 |
| CONTROL | — — | — | 11.0 | 450 | 910 | 50 |

Analysis of the Ca content was performed by the potassium-permanganate volumetric method.

[Culture Conditions]

| Basic culture medium: | Surface humus andosoil (planter culture) 1 m$^2$ |
| Fertilizer administration: | Primary potassium phosphate P/K = 22/28 100 g/m$^2$ Urea, N = 46 50 g/m$^2$ Magnesia lime 50 g/m$^2$ (Ca content: 22%) |
| Cultivation temperature: | 25° C. |
| Cultivation time: | 60 days |
| Light irradiation: | Artificial climate creator 20000 luces × 24 hours × 57 days after screened from light for three days |
| Watering: | Once/day |
| Seed: | Lettuce 20 grains/test area (planter) werw sowed without pre-treatment |
| Thinning: | When 10 days elapse after sowing, 10 favorably growing plants for each example were selected. |
| Administration method: | Administration timing . . . Only once immediately after thinning Administration method . . . A predetermined amount of each calcium agent was dissolve or suspended in 200 ml of water and sprinkled over the entire surface of the planter. |

COMPARATIVE APPLICATION EXAMPLE 2

Tests similar to those of the application example 2 were performed with products of the comparative examples 1 to 6.

The results are likewise shown in Table 4.

APPLICATION EXAMPLE 3

Tests of resistance of black pines against pine wood nematodes were performed under the following administration conditions while administering the calcium agents for plants of Examples 1 to 9 by quantities shown in Table 5, and death rates were measured.

The results are likewise shown in Table 5. [Test Term] From the beginning of April to the end of October

[Administration Conditions]

| Trees to be tested: | Kind . . . Black pine Height of trees . . . Approx. 5 m Number of plants . . . 20 plants/test area |
| Soil: | pH . . . 4.1 |
| Administration method: | Administration timing . . . Only once at the beginning of April Administration method . . . A predetermined amount of each calcium agent was dissolved or suspended in 20 l of water and sprinkled over the surface of the ground in the vicinity of distal ends of the roots. |
| Nematode inoculation method: | Inoculation timing . . . Only once at the beginning of July Inoculation amount . . . 5000/plant |
| Watering: | Rain only |

COMPARATIVE APPLICATION EXAMPLE 3

Tests similar to those of the application example 3 were performed with products of the comparative examples 1 to 6.

The results are likewise shown in Table 5.

TABLE 5

| | AMOUNT OF ADMINISTRATION | | | |
|---|---|---|---|---|
| TEST AREA | AMOUNT OF Ca g/PLANT | AMOUNT OF CHITOSAN g/PLANT | DEATH RATE % |
| EXAMPLE 1 | 400 | 60 | 6 | 10 |
| 2 | 500 | 60 | 6 | 5 |
| 3 | 200 | 60 | 6 | 10 |
| 4 | 300 | 60 | 6 | 15 |
| 5 | 400 | 60 | 6 | 5 |
| 6 | 300 | 60 | 6 | 10 |
| 7 | 600 | 60 | 6 | 5 |
| 8 | 600 | 60 | 6 | 10 |
| 9 | 1200 | 60 | 60 | 0 |
| COMPARATIVE EXAMPLE 1 | 600 | 60 | 6 | 60 |
| 2 | 200 | 60 | 6 | 55 |
| 3 | 200 | 60 | — | 70 |
| 4 | 150 | 60 | — | 70 |
| 5 | 250 | 60 | — | 75 |
| 6 | 270 | 60 | — | 70 |
| CONTROL | — | — | — | 80 |

APPLICATION EXAMPLE 4

Tests of red pines were performed under the following administration conditions while administering the calcium agents for plants of Examples 1 to 9 by quantities shown in Table 6, and amounts of resin secretion were measured to observe whether or not metabolic disorder due to ammonium-sulfate acid rain occurred.

The results are likewise shown in Table 6. [Test Term] From the beginning of April to the end of October

[Administration Conditions]

| | |
|---|---|
| Trees to be tested: | Kind . . . Red pine |
| | Height of trees . . . Approx. 5 m |
| | Number of plants . . . 20 plants/test area |
| Soil: | pH 4.1 |
| Administration method: | Administration timing . . . Only once at the beginning of April |
| | Administration method . . . A predetermined amount of each calcium agent was dissolved or suspended in 20 l of water and sprinkled over the surface of the ground in the vicinity of distal ends of the roots. |
| Acid rain sprinkling method: | Sprinkling method . . . Totally three times, acid rain was sprinkled over the crowns of trees. |
| | Sprinkling amount . . . 10 kg/plant (0.1% solution, pH 5.2) |
| Watering: | Rain only |

COMPARATIVE APPLICATION EXAMPLE 4

Tests similar to those of the application example 4 were performed with products of the comparative examples 1 to 6.

The results are likewise shown in Table 6.

TABLE 6

| | AMOUNT OF ADMINISTRATION | | | |
|---|---|---|---|---|
| TEST AREA | g/PLANT | AMOUNT OF Ca g/PLANT | AMOUNT OF CHITOSAN g/PLANT | AMOUNT OF RESIN SECRETION |
| EXAMPLE 1 | 400 | 60 | 6 | 4 |
| 2 | 500 | 60 | 6 | 5 |
| 3 | 200 | 60 | 6 | 5 |
| 4 | 300 | 60 | 6 | 5 |
| 5 | 400 | 60 | 6 | 5 |
| 6 | 300 | 60 | 6 | 4 |
| 7 | 600 | 60 | 6 | 5 |
| 8 | 600 | 60 | 6 | 5 |
| 9 | 1200 | 60 | 60 | 5 |
| COMPARATIVE EXAMPLE 1 | 600 | 60 | 6 | 3 |
| 2 | 200 | 60 | 6 | 2 |
| 3 | 200 | 60 | — | 2 |
| 4 | 150 | 60 | — | 0 |
| 5 | 250 | 60 | — | 1 |
| 6 | 270 | 60 | — | 1 |
| CONTROL | — | — | — | 0 |

The measurement of secretion amounts of resin (colophony) was performed at the end of October by opening a hole having a diameter of 5 mm and a depth of 3 mm in the trunk of each tree and evaluating states of the resin flowed out after 10 minutes as 5 to 0 in accordance with quantity.

As shown in Tables 3 and 4, it was confirmed that the calcium agent for plants according to the present invention not only promotes growth of komatsuna and lettuce but also increases the amount of absorption of calcium, so as to prevent lime deficiency diseases such as tipburns of lettuce.

Moreover, it was obviously understood from Table 5 that the calcium agent for plants according to the present invention is effective in preventing pine wilt disease of black pines by pine wood nematodes, and it was obviously understood from Table 6 that this calcium agent suppresses the occurrence of metabolic disorder of red pines owing to composite air pollutants. Thus, it was confirmed that the calcium agent for plants according to the present invention, which promotes absorption of calcium into living plants such as vegetables and trees and enhances the physiological activity, can improve the resistance against disease and pest by a remarkable degree.

What is claimed is:

1. A method for promoting the absorption of calcium by a plant, comprising applying to soil in the vicinity of a plant a composition consisting of (A) 0.01–50 parts of a water-soluble low molecular weight chitosan having an average molecular weight of 500 to 30,000 selected from the group consisting of chitosan and derivatives thereof, (B) 100 parts of an ingredient selected from the group consisting of an inorganic substance including a calcium element, a water-soluble organic substance including calcium element, and mixtures thereof, and (C) optionally one or more ingredients selected from the group consisting of excipients, disintegrators, and lubricants.

2. A method for promoting the absorption of calcium by a plant, comprising applying to soil in the vicinity of a plant a composition consisting of (A) 0.01–50 parts of a water-soluble low molecular weight chitosan having an average molecular weight of 500 to 30,000 selected from the group consisting of chitosan and derivatives thereof, (B) 100 parts of an ingredient selected from the group consisting of an inorganic substance including a calcium element, a water-soluble organic substance including calcium element, and mixtures thereof, (C) 1–100 parts of a water-soluble organic acid, and (D) optionally one or more ingredients selected from the group consisting of excipients, disintegrators, and lubricants.

* * * * *